United States Patent
Fakoorian et al.

(10) Patent No.: US 10,355,728 B2
(45) Date of Patent: Jul. 16, 2019

(54) CROSS-OPERATOR CROSS-LINK ADJACENT CHANNEL INTERFERENCE WITH DYNAMIC TDD

(71) Applicant: QUALCOMM Incorporated, San Diego, CA (US)

(72) Inventors: Seyed Ali Akbar Fakoorian, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/991,722

(22) Filed: May 29, 2018

(65) Prior Publication Data

US 2018/0351591 A1    Dec. 6, 2018

Related U.S. Application Data

(60) Provisional application No. 62/513,807, filed on Jun. 1, 2017.

(51) Int. Cl.
*H04W 72/04* (2009.01)
*H04B 1/10* (2006.01)
*H04L 5/14* (2006.01)
*H04L 5/00* (2006.01)
*H04W 16/14* (2009.01)
*H04W 72/08* (2009.01)

(52) U.S. Cl.
CPC ......... *H04B 1/1027* (2013.01); *H04L 5/0091* (2013.01); *H04L 5/1438* (2013.01); *H04L 5/1469* (2013.01); *H04B 2001/1045* (2013.01); *H04B 2001/1054* (2013.01); *H04W 16/14* (2013.01); *H04W 72/042* (2013.01); *H04W 72/0446* (2013.01); *H04W 72/082* (2013.01)

(58) Field of Classification Search
USPC .......................................... 375/346; 370/328
See application file for complete search history.

(56) References Cited

U.S. PATENT DOCUMENTS

| | | | |
|---|---|---|---|
| 2015/0215061 A1* | 7/2015 | Tsai ...................... | H04J 11/0053 370/328 |
| 2017/0251484 A1* | 8/2017 | Negus .................. | H04W 72/082 |
| 2018/0205579 A1* | 7/2018 | Lee .......................... | H04L 25/03 |

* cited by examiner

*Primary Examiner* — Eva Y Puente
(74) *Attorney, Agent, or Firm* — Liem T. Do

(57) ABSTRACT

Cross-operator, cross-link adjacent channel interference with dynamic time division duplex (TDD) is discussed. For a network environment with co-site base stations, base stations attempting to switch the default direction to downlink may monitor for uplink reservations signals transmitted between the neighboring base stations in various ways. For example, the co-site base station may only monitor for an uplink reservation signal on its own channel or may attempt to monitor for the reservation signal in its own channel and adjacent channels. The adjacent base stations may transmit reservation signals in their own channel and the adjacent channels, so that the co-site base station would monitor for the communication intention by monitoring its own channel. Further, each network operator may be assigned a specific symbol location for the reservation signals. Still other aspects provide the neighboring base stations from different operators to pool the channels and transmit according to a shared spectrum.

23 Claims, 10 Drawing Sheets

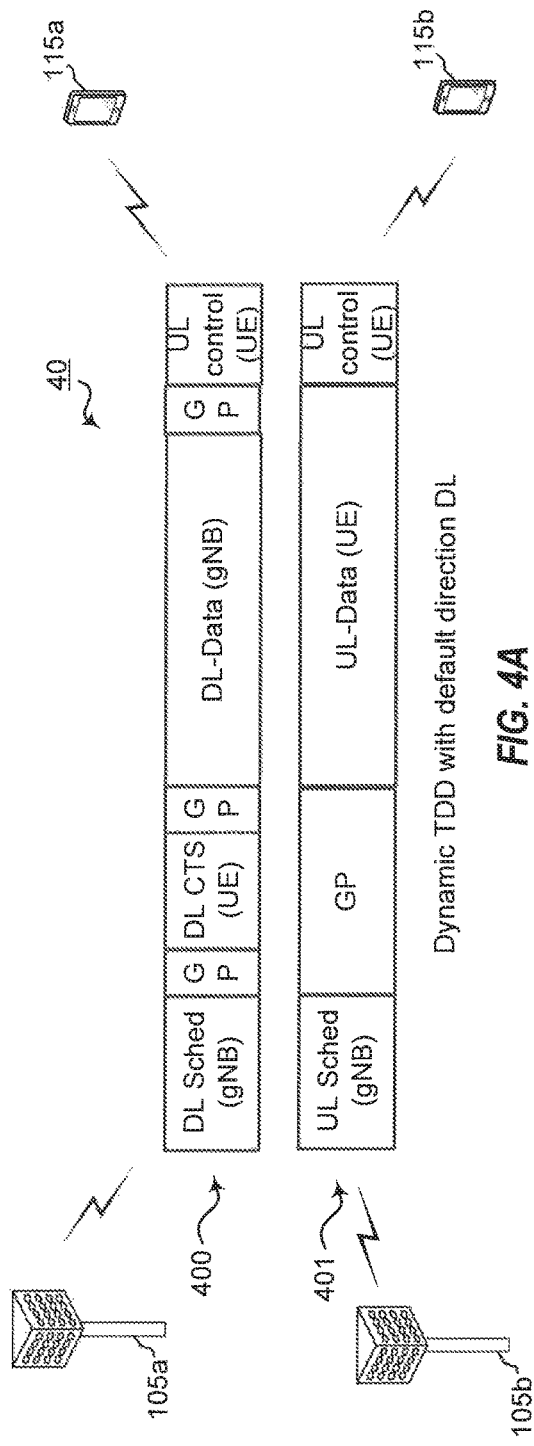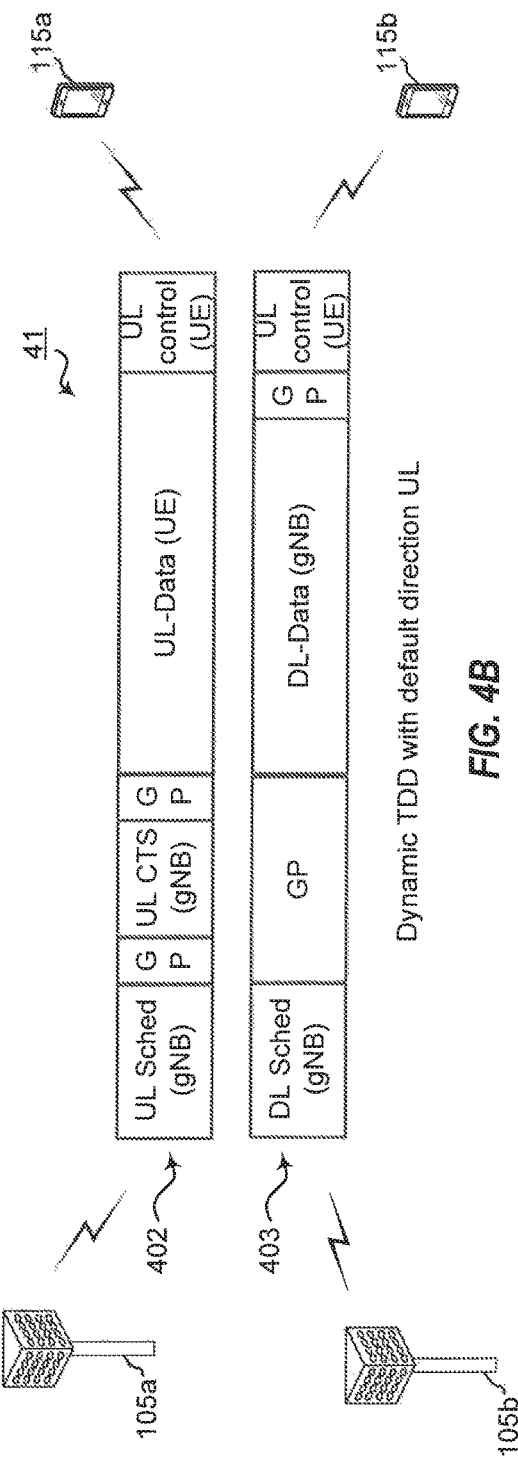

CROSS-OPERATOR CROSS-LINK ADJACENT CHANNEL INTERFERENCE WITH DYNAMIC TDD

CROSS-REFERENCE TO RELATED APPLICATIONS

This application claims the benefit of U.S. Provisional Patent Application No. 62/513,807, entitled, "CROSS-OPERATOR CROSS-LINK ADJACENT CHANNEL INTERFERENCE WITH DYNAMIC TDD," filed on Jun. 1, 2017, which is expressly incorporated by reference herein in its entirety.

BACKGROUND

Field

Aspects of the present disclosure relate generally to wireless communication systems, and more particularly, to cross-operator cross-link adjacent channel interference with dynamic time division duplex (TDD).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication, includes receiving, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, detecting, by the first base station, data available for downlink transmission on a first channel during one of the plurality of flexible transmission intervals, monitoring, by the first base station, for an uplink reservation signal from one or more base stations of the plurality of base stations, wherein the first base station is operated by a first network operator at a first channel and at least one adjacent base station of the one or more base stations is operated by another network operator on a second channel adjacent to the first channel, and determining, by the first base station, whether to transmit the data based on results of the monitoring.

In an additional aspect of the disclosure, a method of wireless communication, includes receiving, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, and wherein the first base station is operated by a first network operator at a first channel and at least one adjacent base station of the one or more base stations is operated by another network operator on a second channel adjacent to the first channel, receiving, by the first base station, a request for uplink transmission on a first channel during one of the plurality of flexible transmission intervals, and transmitting, by the first base station, an uplink reservation signal.

In an additional aspect of the disclosure, a method of wireless communications, includes transmitting, by a first base station operated by a first network operator, system information over a primary channel of a plurality of pooled adjacent channels, wherein the plurality of pooled adjacent channels includes the primary channel associated with the first network operator and at least one additional channels each of the at least one additional channels associated with at least one additional network operators, identifying, by the first base station, non-critical data for transmission, monitoring, by the first base station, for communications on one adjacent channel of the at least one additional channels with another base station operated by the at least one additional network operators, and transmitting, by the first base station, the non-critical data on the one adjacent channel in response to failure to detect transmissions on the one adjacent channel.

In an additional aspect of the disclosure, an apparatus configured for wireless communications, includes means for receiving, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, means for detecting, by the first base station, data available for downlink transmission on a first channel during one of the plurality of flexible transmission intervals, means for monitoring, by the first base station, for an uplink reservation signal from one or more base stations of the plurality of base stations, wherein the first base station is operated by a first network operator at a first channel and at least one adjacent base station of the one or more base stations is operated by another network operator on a second channel adjacent to the first channel, and means for determining, by the first base station, whether to transmit the data based on results of the means for monitoring.

In an additional aspect of the disclosure, an apparatus configured for wireless communications, includes means for receiving, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, and wherein the first base station is operated by a first network operator at a first channel and at least one adjacent base station of the one or more base stations is operated by another network operator on a second channel adjacent to the first channel, means for receiving, by the first base station, a request for uplink transmission on a first channel during one of the plurality of flexible transmission intervals, and means for transmitting, by the first base station, an uplink reservation signal.

In an additional aspect of the disclosure, an apparatus configured for wireless communications, includes means for transmitting, by a first base station operated by a first network operator, system information over a primary channel of a plurality of pooled adjacent channels, wherein the plurality of pooled adjacent channels includes the primary channel associated with the first network operator and at least one additional channels each of the at least one additional channels associated with at least one additional network operators, means for identifying, by the first base station, non-critical data for transmission, means for monitoring, by the first base station, for communications on one adjacent channel of the at least one additional channels with another base station operated by the at least one additional network operators, and means for transmitting, by the first base station, the non-critical data on the one adjacent channel in response to failure to detect transmissions on the one adjacent channel.

In an additional aspect of the disclosure, a non-transitory computer-readable medium having program code recorded thereon. The program code further includes code to receive, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, code to detect, by the first base station, data available for downlink transmission on a first channel during one of the plurality of flexible transmission intervals, code to monitor, by the first base station, for an uplink reservation signal from one or more base stations of the plurality of base stations, wherein the first base station is operated by a first network operator at a first channel and at least one adjacent base station of the one or more base stations is operated by another network operator on a second channel adjacent to the first channel, and code to determine, by the first base station, whether to transmit the data based on results of execution of the code to monitor.

In an additional aspect of the disclosure, a non-transitory computer-readable medium having program code recorded thereon. The program code further includes code to receive, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, and wherein the first base station is operated by a first network operator at a first channel and at least one adjacent base station of the one or more base stations is operated by another network operator on a second channel adjacent to the first channel, code to receive, by the first base station, a request for uplink transmission on a first channel during one of the plurality of flexible transmission intervals, and code to transmit, by the first base station, an uplink reservation signal.

In an additional aspect of the disclosure, a non-transitory computer-readable medium having program code recorded thereon. The program code further includes code to transmit, by a first base station operated by a first network operator, system information over a primary channel of a plurality of pooled adjacent channels, wherein the plurality of pooled adjacent channels includes the primary channel associated with the first network operator and at least one additional channels each of the at least one additional channels associated with at least one additional network operators, code to identify, by the first base station, non-critical data for transmission, code to monitor, by the first base station, for communications on one adjacent channel of the at least one additional channels with another base station operated by the at least one additional network operators, and code to transmit, by the first base station, the non-critical data on the one adjacent channel in response to failure to detect transmissions on the one adjacent channel.

In an additional aspect of the disclosure, an apparatus configured for wireless communication is disclosed. The apparatus includes at least one processor, and a memory coupled to the processor. The processor is configured to receive, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, to detect, by the first base station, data available for downlink transmission on a first channel during one of the plurality of flexible transmission intervals, code to monitor, by the first base station, for an uplink reservation signal from one or more base stations of the plurality of base stations, wherein the first base station is operated by a first network operator at a first channel and at least one adjacent base station of the one or more base stations is operated by another network operator on a second channel adjacent to the first channel, and code to determine, by first base station, whether to transmit the data based on results of execution of the configuration to monitor In an additional aspect of the disclosure, an apparatus configured for wireless communication is disclosed. The apparatus includes at least one processor, and a memory coupled to the processor. The processor is configured to receive, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, and wherein the first base station is operated by a first network operator at a first channel and at least one adjacent base station of the one or more base stations is operated by another network operator on a second channel adjacent to the first channel, to receive, by the first base station, a request for uplink transmission on a first channel during one of the plurality of flexible transmission intervals, and to transmit, by the first base station, an uplink reservation signal.

In an additional aspect of the disclosure, an apparatus configured for wireless communication is disclosed. The apparatus includes at least one processor, and a memory coupled to the processor. The processor is configured to transmit, by a first base station operated by a first network operator, system information over a primary channel of a plurality of pooled adjacent channels, wherein the plurality of pooled adjacent channels includes the primary channel associated with the first network operator and at least one additional channels each of the at least one additional channels associated with at least one additional network operators, to identify, by the first base station, non-critical data for transmission, to monitor, by the first base station, for communications on one adjacent channel of the at least one additional channels with another base station operated by the at least one additional network operators, and to transmit, by the first base station, the non-critical data on the one adjacent channel in response to failure to detect transmissions on the one adjacent channel.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 4A and 4B are block diagrams illustrating base stations and UEs communicating using dynamic TDD transmission configurations.

DETAILED DESCRIPTION

Figure 1:
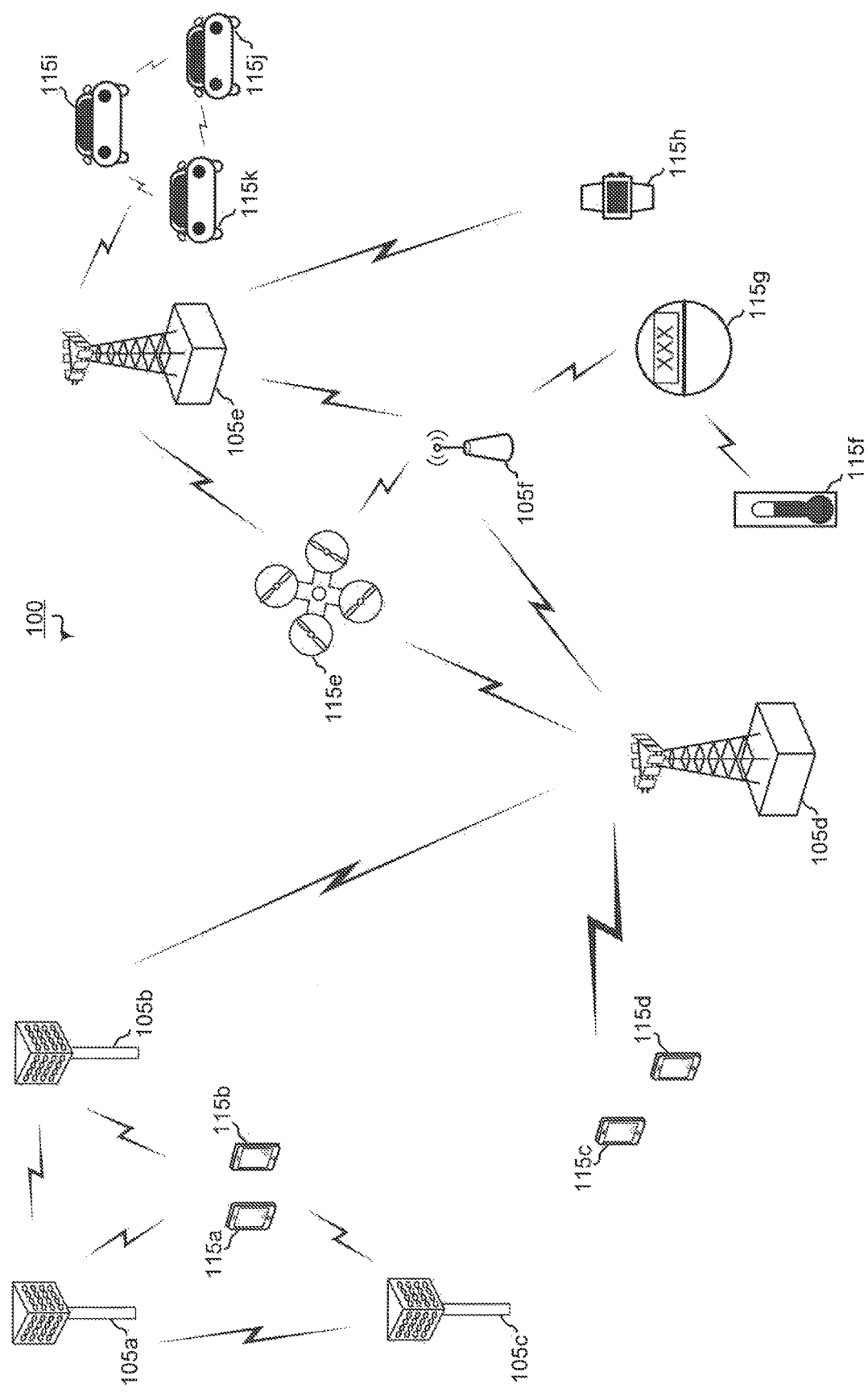
FIG. 1 is a block diagram illustrating details of a wireless communication system.

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
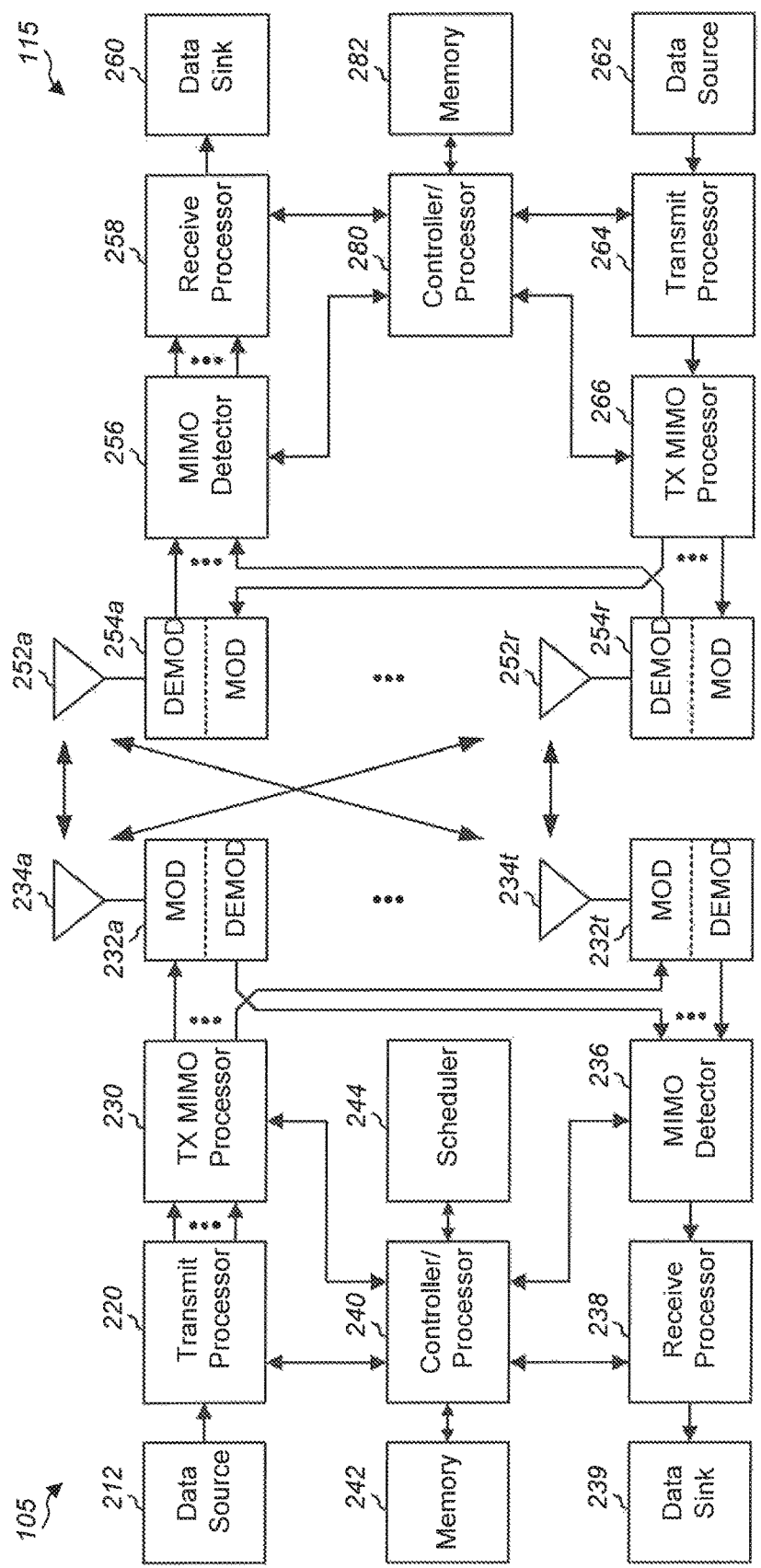
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 5A and 5B, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

Use of a medium-sensing procedure to contend for access to an unlicensed shared spectrum may result in communication inefficiencies. This may be particularly evident when multiple network operating entities (e.g., network operators) are attempting to access a shared resource. In 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3:
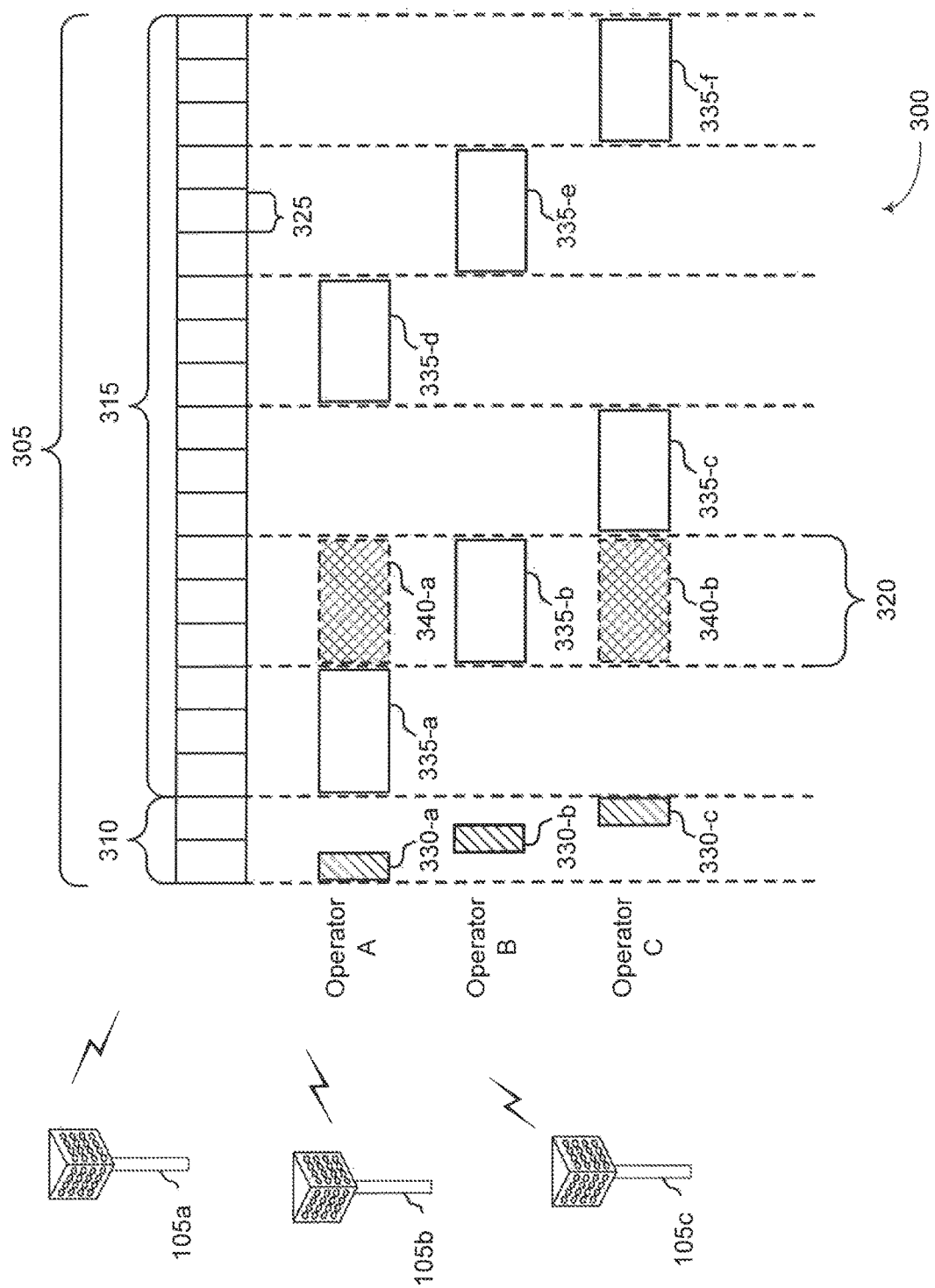
FIG. 3 is a block diagram illustrating a wireless communication system including base stations that use directional wireless beams.

FIG. 3 illustrates an example of a timing diagram 300 for coordinated resource partitioning. The timing diagram 300 includes a superframe 305, which may represent a fixed duration of time (e.g., 20 ms). Superframe 305 may be repeated for a given communication session and may be used by a wireless system such as 5G network 100 described with reference to FIG. 1. The superframe 305 may be divided into intervals such as an acquisition interval (A-INT) 310 and an arbitration interval 315. As described in more detail below, the A-INT 310 and arbitration interval 315 may be subdivided into sub-intervals, designated for certain resource types, and allocated to different network operating entities to facilitate coordinated communications between the different network operating entities. For example, the arbitration interval 315 may be divided into a plurality of sub-intervals 320. Also, the superframe 305 may be further divided into a plurality of subframes 325 with a fixed duration (e.g., 1 ms). While timing diagram 300 illustrates three different network operating entities (e.g., Operator A, Operator B, Operator C), the number of network operating entities using the superframe 305 for coordinated communications may be greater than or fewer than the number illustrated in timing diagram 300.

The A-INT 310 may be a dedicated interval of the superframe 305 that is reserved for exclusive communications by the network operating entities. In some examples, each network operating entity may be allocated certain resources within the A-INT 310 for exclusive communications. For example, resources 330-*a* may be reserved for exclusive communications by Operator A, such as through base station 105*a*, resources 330-*b* may be reserved for exclusive communications by Operator B, such as through base station 105*b*, and resources 330-*c* may be reserved for exclusive communications by Operator C, such as through base station 105*c*. Since the resources 330-*a* are reserved for exclusive communications by Operator A, neither Operator B nor Operator C can communicate during resources 330-*a*, even if Operator A chooses not to communicate during those resources. That is, access to exclusive resources is limited to the designated network operator. Similar restrictions apply to resources 330-*b* for Operator B and resources 330-*c* for Operator C. The wireless nodes of Operator A (e.g, UEs 115 or base stations 105) may communicate any information desired during their exclusive resources 330-*a*, such as control information or data.

When communicating over an exclusive resource, a network operating entity does not need to perform any medium sensing procedures (e.g., listen-before-talk (LBT) or clear channel assessment (CCA)) because the network operating entity knows that the resources are reserved. Because only the designated network operating entity may communicate over exclusive resources, there may be a reduced likelihood of interfering communications as compared to relying on medium sensing techniques alone (e.g., no hidden node problem). In some examples, the A-INT 310 is used to transmit control information, such as synchronization signals (e.g., SYNC signals), system information (e.g., system information blocks (SIBs)), paging information (e.g., physical broadcast channel (PBCH) messages), or random access information (e.g., random access channel (RACH) signals). In some examples, all of the wireless nodes associated with a network operating entity may transmit at the same time during their exclusive resources.

In some examples, resources may be classified as prioritized for certain network operating entities. Resources that are assigned with priority for a certain network operating entity may be referred to as a guaranteed interval (G-INT) for that network operating entity. The interval of resources used by the network operating entity during the G-INT may be referred to as a prioritized sub-interval. For example, resources 335-a may be prioritized for use by Operator A and may therefore be referred to as a G-INT for Operator A (e.g., G-INT-OpA). Similarly, resources 335-b may be prioritized for Operator B, resources 335-c may be prioritized for Operator C, resources 335-d may be prioritized for Operator A, resources 335-e may be prioritized for Operator B, and resources 335-f may be prioritized for operator C.

The various G-INT resources illustrated in FIG. 3 appear to be staggered to illustrate their association with their respective network operating entities, but these resources may all be on the same frequency bandwidth. Thus, if viewed along a time-frequency grid, the G-INT resources may appear as a contiguous line within the superframe 305. This partitioning of data may be an example of time division multiplexing (TDM). Also, when resources appear in the same sub-interval (e.g., resources 340-a and resources 335-b), these resources represent the same time resources with respect to the superframe 305 (e.g., the resources occupy the same sub-interval 320), but the resources are separately designated to illustrate that the same time resources can be classified differently for different operators.

When resources are assigned with priority for a certain network operating entity (e.g., a G-INT), that network operating entity may communicate using those resources without having to wait or perform any medium sensing procedures (e.g., LBT or CCA). For example, the wireless nodes of Operator A are free to communicate any data or control information during resources 335-a without interference from the wireless nodes of Operator B or Operator C.

A network operating entity may additionally signal to another operator that it intends to use a particular G-INT. For example, referring to resources 335-a, Operator A may signal to Operator B and Operator C that it intends to use resources 335-a. Such signaling may be referred to as an activity indication. Moreover, since Operator A has priority over resources 335-a, Operator A may be considered as a higher priority operator than both Operator B and Operator C. However, as discussed above, Operator A does not have to send signaling to the other network operating entities to ensure interference-free transmission during resources 335-a because the resources 335-a are assigned with priority to Operator A.

Similarly, a network operating entity may signal to another network operating entity that it intends not to use a particular G-INT. This signaling may also be referred to as an activity indication. For example, referring to resources 335-b, Operator B may signal to Operator A and Operator C that it intends not to use the resources 335-b for communication, even though the resources are assigned with priority to Operator B. With reference to resources 335-b, Operator B may be considered a higher priority network operating entity than Operator A and Operator C. In such cases, Operators A and C may attempt to use resources of sub-interval 320 on an opportunistic basis. Thus, from the perspective of Operator A, the sub-interval 320 that contains resources 335-b may be considered an opportunistic interval (O-INT) for Operator A (e.g., O-INT-OpA). For illustrative purposes, resources 340-a may represent the O-INT for Operator A. Also, from the perspective of Operator C, the same sub-interval 320 may represent an O-INT for Operator C with corresponding resources 340-b. Resources 340-a, 335-b, and 340-b all represent the same time resources (e.g., a particular sub-interval 320), but are identified separately to signify that the same resources may be considered as a G-INT for some network operating entities and yet as an O-INT for others.

To utilize resources on an opportunistic basis, Operator A and Operator C may perform medium-sensing procedures to check for communications on a particular channel before transmitting data. For example, if Operator B decides not to use resources 335-b (e.g., G-INT-OpB), then Operator A may use those same resources (e.g., represented by resources 340-a) by first checking the channel for interference (e.g., LBT) and then transmitting data if the channel was determined to be clear. Similarly, if Operator C wanted to access resources on an opportunistic basis during sub-interval 320 (e.g., use an O-INT represented by resources 340-b) in response to an indication that Operator B was not going to use its G-INT, Operator C may perform a medium sensing procedure and access the resources if available. In some cases, two operators (e.g., Operator A and Operator C) may attempt to access the same resources, in which case the operators may employ contention-based procedures to avoid interfering communications. The operators may also have sub-priorities assigned to them designed to determine which operator may gain access to resources if more than operator is attempting access simultaneously.

In some examples, a network operating entity may intend not to use a particular G-INT assigned to it, but may not send out an activity indication that conveys the intent not to use the resources. In such cases, for a particular sub-interval 320, lower priority operating entities may be configured to monitor the channel to determine whether a higher priority operating entity is using the resources. If a lower priority operating entity determines through LBT or similar method that a higher priority operating entity is not going to use its G-INT resources, then the lower priority operating entities may attempt to access the resources on an opportunistic basis as described above.

In some examples, access to a G-INT or O-INT may be preceded by a reservation signal (e.g., request-to-send (RTS)/clear-to-send (CTS)), and the contention window (CW) may be randomly chosen between one and the total number of operating entities.

In some examples, an operating entity may employ or be compatible with coordinated multipoint (CoMP) communications. For example an operating entity may employ CoMP and dynamic time division duplex (TDD) in a G-INT and opportunistic CoMP in an O-INT as needed.

In the example illustrated in FIG. 3, each sub-interval 320 includes a G-INT for one of Operator A, B, or C. However, in some cases, one or more sub-intervals 320 may include resources that are neither reserved for exclusive use nor reserved for prioritized use (e.g., unassigned resources). Such unassigned resources may be considered an O-INT for any network operating entity, and may be accessed on an opportunistic basis as described above.

In some examples, each subframe 325 may contain 14 symbols (e.g., 250-µs for 60 kHz tone spacing). These subframes 325 may be standalone, self-contained Interval-Cs (ITCs) or the subframes 325 may be a part of a long ITC.

An ITC may be a self-contained transmission starting with a downlink transmission and ending with a uplink transmission. In some embodiments, an ITC may contain one or more subframes 325 operating contiguously upon medium occupation. In some cases, there may be a maximum of eight network operators in an A-INT 310 (e.g., with duration of 2 ms) assuming a 250-μs transmission opportunity.

Although three operators are illustrated in FIG. 3, it should be understood that fewer or more network operating entities may be configured to operate in a coordinated manner as described above. In some cases, the location of the G-INT, O-INT, or A-INT within superframe 305 for each operator is determined autonomously based on the number of network operating entities active in a system. For example, if there is only one network operating entity, each sub-interval 320 may be occupied by a G-INT for that single network operating entity, or the sub-intervals 320 may alternate between G-INTs for that network operating entity and O-INTs to allow other network operating entities to enter. If there are two network operating entities, the sub-intervals 320 may alternate between G-INTs for the first network operating entity and G-INTs for the second network operating entity. If there are three network operating entities, the G-INT and O-INTs for each network operating entity may be designed as illustrated in FIG. 3. If there are four network operating entities, the first four sub-intervals 320 may include consecutive G-INTs for the four network operating entities and the remaining two sub-intervals 320 may contain O-INTs. Similarly, if there are five network operating entities, the first five sub-intervals 320 may contain consecutive G-INTs for the five network operating entities and the remaining sub-interval 320 may contain an O-INT. If there are six network operating entities, all six sub-intervals 320 may include consecutive G-INTs for each network operating entity. It should be understood that these examples are for illustrative purposes only and that other autonomously determined interval allocations may be used.

It should be understood that the coordination framework described with reference to FIG. 3 is for illustration purposes only. For example, the duration of superframe 305 may be more or less than 20 ms. Also, the number, duration, and location of sub-intervals 320 and subframes 325 may differ from the configuration illustrated. Also, the types of resource designations (e.g., exclusive, prioritized, unassigned) may differ or include more or less sub-designations.

Dynamic time division duplex (TDD) transmission configurations that include cross-link interference (CLI) management may provide better user throughput compared to static TDD or dynamic TDD transmission configurations without CLI management. The interference management techniques used in CLI management include techniques, such as sensing based methods (e.g., energy based sensing, signal detection based sensing, over the air (OTA) measurement, etc.), advanced receiver technologies (e.g., minimum mean square error (MMSE) with interference rejection combining (IRC), enhanced MMSE-IRS (eMMSE-IRC), interference cancelation (IC), etc.), coordinated scheduling/beamforming, power control, link adaptation, and the like. However, dynamic TDD may impose CLI between co-site macro cells at adjacent channels. For purposes of this application, co-site macro cells are macro cells or base stations that may be operated by multiple different operators that share the same or geographically close sites and deploy macro cells or base stations on those same or geographically close sites. When different operators use different links for data transmission, the transmit power of the base stations may cause severe cross-operator adjacent channel interference to the signal reception of the other base stations deployed at the co-site location. This cross-operator interference issue may occur when the multiple co-sites are close enough geographically.

Cross-operator cross-link interference may occur between co-site macro cells at adjacent channels when dynamic TDD transmission configurations are used. For example, when a first base station from a first network operator transmits, it may cause severe interference to the signal reception of a co-site base station from a second network operator. Conversely, when the co-site base station from the second network operator transmits, it may also severe interference to the signal reception of the first base station from the first network operator. The current dynamic TDD cross-link interference management solutions do not generally address the issues in this co-site scenario, as the current solutions generally consider single network operator deployments or multiple operator deployments that share the same channel.

FIGS. 4A and 4B are block diagrams illustrating base stations 105a-105b and UEs 115a-115b communicating using dynamic TDD transmission configurations. FIG. 4A identifies a dynamic TDD having a default downlink direction 40. Thus, downlink transmissions will have priority over uplink transmission when direction collisions may occur between transmissions of base station 105a operated by a first network operator and base station 105b operated by a second network operator. Base station 105a communicates over transmission stream 400 with UE 115a. With a default downlink direction 40, transmission stream 400 begins with downlink scheduling from base station 105a. After a guard period, a downlink reservation signal or clear-to-send (CTS) is transmitted by the intended receiver, UE 115a.

Base station 105b receives an indication of UE 115b having data for uplink communications. Thus, at the beginning of transmission stream 401, base station 105b attempts to schedule uplink transmissions with UE 115b. During a guard period, base station 105b will attempt to listen for any downlink CTS from the neighboring receiver. If no downlink CTS is detected, then base station 105b may flip the direction from default downlink direction 40 to receive the uplink transmission from UE 115b, followed by uplink control signaling from UE 115b. However, if UE 115a transmits downlink CTS that is observed or detected by either base station 105b or UE 115b, the uplink transmission will be delayed.

When UE 115a transmits the downlink CTS, after another guard period, base station 105a will transmit the downlink data. After another guard period, base station 105a will receive uplink control signals from UE 115a.

FIG. 4B illustrates a default uplink direction 41. Similar to default downlink direction 40 of FIG. 4A, base station 105a, with default uplink direction 41, will begin with uplink scheduling in transmission stream 402. As the intended receiver of the uplink transmission, base station 105a will transmit an uplink reservation signal or CTS which signals neighboring network nodes to back off if the neighboring network node communication would interfere with reception. UE 115a would transmit the uplink signal followed by the uplink control signals.

Similar to FIG. 4A, when a neighboring base station, such as base station 105b intends to attempt to flip the direction from default uplink direction 41, downlink scheduling will begin the transmission of transmission stream 403. During the following guard period, base station 105b and UE 115b will listen for an uplink CTS. If an uplink CTS is detected, base station 105b will delay downlink transmission. Otherwise, UE 115b will transmit the downlink data.

Because co-site base stations from different operators may on the same or geographically close sites, the adjacent channel interference will be dominated by one network operator's base station's transmission interfering with another network operator's base station's reception. UEs in such scenarios are typically not co-located and further transmit using much less transmit power compared to the base stations. Therefore, any expected interference from one network operator's UE's transmission interfering with another network operator's UE's reception would not be as severe as the interference caused by the base stations. Various aspects of the present disclosure are directed to accommodating potential cross-link cross-operator interference caused by co-site base stations communicating over adjacent channels.

It should be noted that OTA measurements may be used to perform dynamic TDD with single OP. Intra-site CL1 within base stations of the same network operator can be handled with intra-site coordination and, thus, not discussed herein.

Figures 5A, 5B:
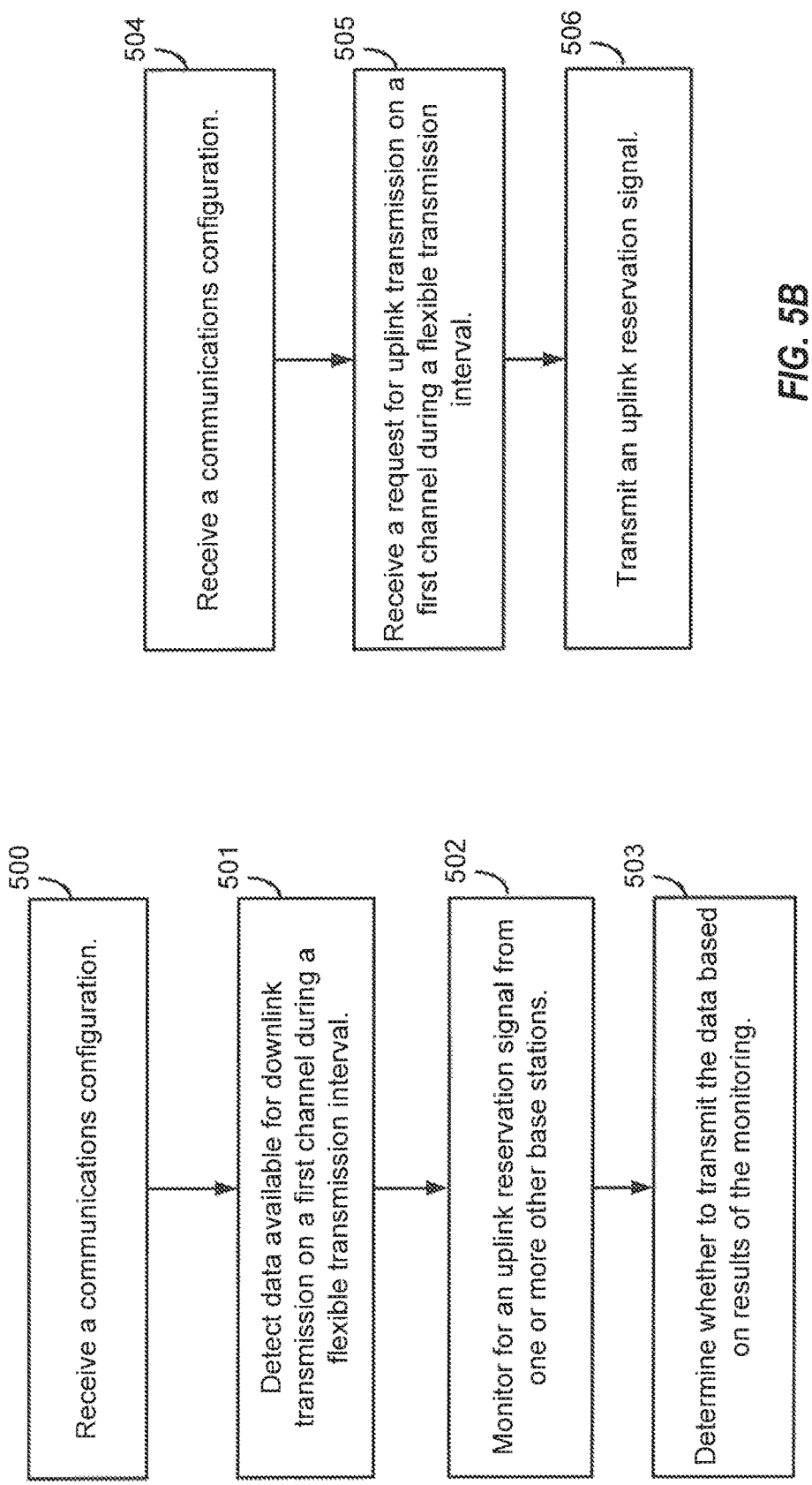
FIGS. 5A and 5B are block diagrams illustrating example blocks executed to implement one aspect of the present disclosure.
Figure 10:
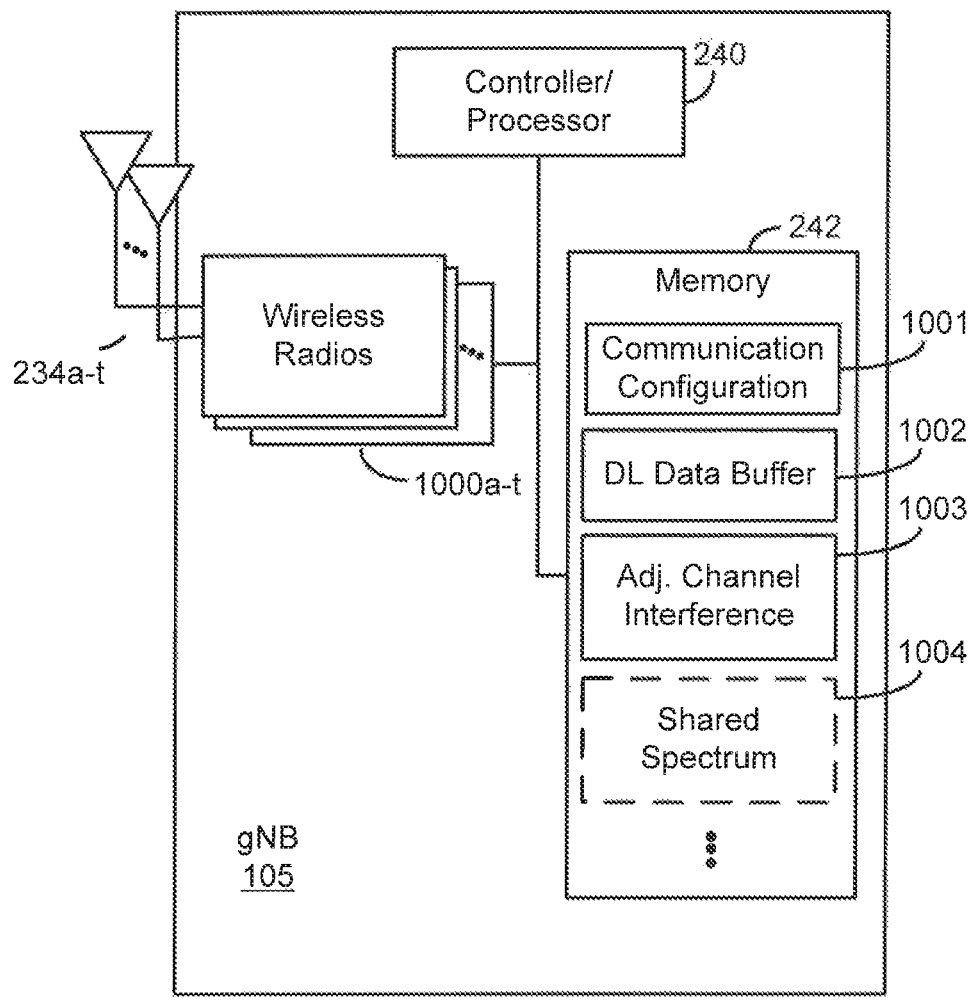
FIG. 10 is a block diagram illustrating an example base station configured according to aspects of the present disclosure.

FIGS. 5A and 5B are block diagrams illustrating example blocks executed to implement one aspect of the present disclosure. The example blocks will also be described with respect to gNB 105 as illustrated in FIG. 10. FIG. 10 is a block diagram illustrating gNB 105 configured according to one aspect of the present disclosure. gNB 105 includes the structure, hardware, and components as illustrated for eNB 105 of FIG. 2. For example, gNB 105 includes controller/processor 240, which operates to execute logic or computer instructions stored in memory 242, as well as controlling the components of gNB 105 that provide the features and functionality of gNB 105. gNB 105, under control of controller/processor 240, transmits and receives signals via wireless radios 1000a-t and antennas 234a-t. Wireless radios 1000a-t includes various components and hardware, as illustrated in FIG. 2 for gNB 105, including modulator/demodulators 232a-t, MIMO detector 236, receive processor 238, transmit processor 220, and TX MIMO processor 230.

The blocks illustrated with respect to FIG. 5A may be executed by co-site base stations that may be attempting to flip the default transmission direction, while the blocks illustrated with respect to FIG. 5B may be executed by co-site base stations communicating according to the default transmission direction.

At block 500 and 504, the co-site base stations receive a communication configuration. For example, a base station, such as gNB 105, receives the communication configuration via antennas 234a-t and wireless radios 1000a-t, and, under control of controller/processor 240, stores the communication configuration at communications configuration 1001, in memory 242. The co-site base stations, each of which may be separately represented by gNB 105, may be multiple base stations each from different network operators that operate communications on adjacent channels. The communications configuration is agreed to by the co-site base stations establishing an agreed downlink/uplink split of transmission time intervals (TTIs) and which identifies the default transmission direction. In the presently described example, the default direction is the uplink direction. The communication configuration includes a set of fixed TTIs that are each dedicated for either downlink or uplink direction. In such fixed or dedicated TTIs no dynamic TDD transmission configurations are allowed. In addition to the fixed TTIs, a set of flexible TTIs are included. The flexible TTIs allow for dynamic TDD transmissions.

At block 501, the co-site base station detects data available for downlink transmission on a first channel during a flexible transmission interval. For example, the co-site base station, such as gNB 105, identifies a downlink transmission opportunity by detecting data for download in download data buffer 1002, stored in memory 242. Because the dynamic TDD operation is allowed in the flexible TTIs, the downlink transmission opportunity would occur at the flexible TTI. Thus, with the default uplink direction, the co-site base station, gNB 105, will want to flip the direction for transmission during such flexible TTIs. The co-side base station, gNB 105, of FIG. 5A transmits on an adjacent channel via wireless radios 1000a-t and antennas 234a-t to the other co-site base stations, including the base stations schedule to receive uplink transmission.

At block 502, the co-site base station monitors for an uplink reservation signal from one or more other base stations. In addressing cross-operator, cross-link adjacent channel interference, base stations configured according to the various aspects of the present disclosure include adjacent channel interference logic 1003, stored in memory 242. Under control of controller/processor 240, gNB 105 executes adjacent channel interference logic 1003 to create an execution environment that monitors for such uplink reservation signals transmitted from the neighboring base stations. Various aspects of the present disclosure as described herein will describe different operations for monitoring for the uplink reservation signal within the execution environment of adjacent channel interference logic 1003. For example, the co-site base station, gNB 105, may only monitor for an uplink reservation signal (e.g., uplink CTS) on its own channel. Alternatively, the co-site base station, gNB 105, may attempt to monitor for uplink CTS in its own channel and the adjacent channels of the other co-site base stations. Alternatively still, the adjacent base stations may be configured to transmit uplink CTS in their own channel and the adjacent channels, so that the co-site base station, gNB 105, would monitor for the adjacent base station communication intention by monitoring its own channel. Further still, each network operator may be assigned a specific symbol location for transmitting uplink CTS, thus, the co-site base station, gNB 105, attempting to flip to downlink direction may perform energy detection at each neighboring adjacent location to detect such transmissions. Accordingly, the various aspects of the present disclosure may provide a number of different operations to implement the monitoring.

At block 503, the co-site base station determines whether to transmit the data based on the results of the monitoring. Within the execution environment of adjacent channel interference logic 1003, various aspect of the present disclosure may provide for gNB 105 to determine to transmit via wireless radios 1000a-t and antennas 234a-t according to a modified transmission configuration in order to reduce the potential interference to the adjacent channels. For example, when the aspect calls for modified transmission, the co-site base station, gNB 105, may either transmit in the center band of the transmission band in order to reduce potential interference to the adjacent bands. In such aspects, the power spectral density of the center band transmission would be selected in order to meet the standards for channel occupancy. Alternatively, the co-site base station, gNB 105, may transmit using a reduced power at the edge bands. When no reservation signals are detected, some aspects will provide for transmitting with normal power over the entire transmission band.

With FIG. 5B, at block 505, the co-site base station receives a request for uplink transmission on a first channel during a flexible transmission interval. For purposes of the example illustrated for a co-site base station that has the transmission opportunity in the default uplink direction, gNB 105 may also serve as an example base station. In the default uplink direction transmission opportunity, the logic of the various aspects of the present disclosure arise during the flexible TTIs. gNB 105 would execute adjacent channel interference logic 1003 to create an execution environment that allows gNB 105 to consider operations in a co-site location among neighboring base stations of one or more different network operators. In the fixed TTIs, no opportunity or availability to flip directions for dynamic TDD are allowed. Thus, in the described example aspect, the uplink transmission request arises during the flexible TTIs. The first channel in the described example of FIG. 5B is adjacent to the first channel in the described example of FIG. 5A.

At block 506, the co-site base station transmits an uplink reservation signal. According to the various aspects of the present disclosure, various operations for transmitting the uplink CTS are provided. In one example aspect, the uplink CTS is transmitted by gNB 105 via wireless radios 1000a-t and antennas 234a-t only in the center band of the first channel. In an alternative aspect, the uplink CTS is transmitted by gNB 105 in the first channel and the adjacent channels of the other co-site base stations. Further alternative aspects may assign a specific symbol location for each network operator, such that the uplink CTS would be transmitted by gNB 105 only in the specific symbol location in the first channel. The neighboring adjacent base stations would perform energy detection at the symbol location to detect any leakage interference from the assigned symbol location, indicating intended uplink reception.

Figure 6:
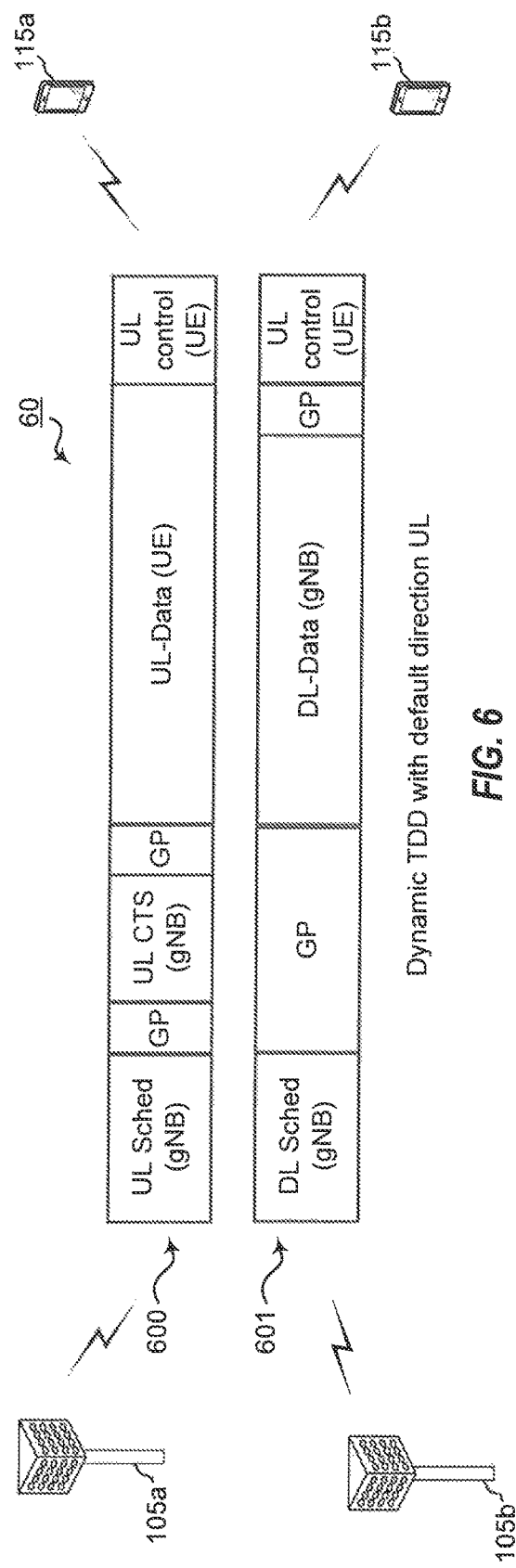
FIG. 6 is a block diagram illustrating co-site base stations and UEs configured according to aspects of the present disclosure.

FIG. 6 is a block diagram illustrating co-site base stations, base stations 105a-105b, and UEs 115a-115b configured according to aspects of the present disclosure. Base station 105a and UE 115a are from a first network operator and communicate on transmission stream 600 using a first channel, while base station 105b and UE 115b are from a second network operator and communicate on transmission stream 601 using a second channel that's adjacent to the first channel. The multiple network operators within the same or geographically close sites would have agreed on a communications configuration of uplink/downlink splits, which indicate a default direction. For purposes of the described example aspects, the default direction is uplink. In addition, according to the example aspects illustrated in FIG. 6, the multiple network operators may agree on a set of fixed TTIs dedicated for downlink or uplink with no dynamic TDD allowed. Dynamic TDD is allowed on the remaining flexible TTIs. On flexible TTIs with a default uplink direction, the base stations, such as base station 105a, with the default uplink direction transmit uplink reservation signals (e.g., uplink CTS) over transmission stream 600.

In order to minimize potential interference to adjacent base stations' reception of base station 105a's uplink CTS, base station 105a would either transmit the uplink CTS in either the center band of the transmission channel from each network operator or use low power on the edge bands. Either operation would be transmitted using enough transmit power for the power spectral density over the whole channel to sufficiently occupy that channel.

In a first aspect, if base station 105b is able to flip the transmission direction to downlink based on the measurement of uplink CTS, it may transmit the downlink data using a modified transmission configuration. The modified transmission configuration transmits on the center band of the transmission channel only or use reduced power on the edge bands. In this first aspect, since base station 105b does not need to hear from the adjacent channel of transmission stream 600, the co-site base stations with adjacent channels are allowed to coexist with minimal complexity. For example, such an operation would allow LTE-NR adjacent channel to coexist with legacy LTE operations.

It should be noted that, in flexible TTIs with a default downlink (not shown), the UEs with the default downlink direction would transmit downlink CTS. The downlink CTS could be transmitted in the full band. If UE is able to flip the default downlink to uplink based on the measurement of DL CTS, the UE can transmit on the full band.

FIG. 6 may also illustrate an example second aspect. In similar fashion to the first aspect described above, base station 105a may send the uplink CTS either in the center band of the transmission channel or by reducing power on the edge bands. However, in the second aspect, base station 105b attempts to directly detect the uplink CTS from base station 105a on the adjacent channel used by base station 105a in addition to monitoring for uplink CTS from base stations of its own second network operator. If base station 105b does not detect uplink CTS from base stations of its own second network operator, but detects uplink CTS from the adjacent channel of the first network operator, base station 105b will use the modified transmission configuration by transmitting the downlink data either on the center band of the transmission channel or by reducing power on edge bands. However, if base station 105b does not detect uplink CTS from base stations of either its own second network operator or the first network operator, base station 105b will use the full band to transmit downlink data with a default uplink direction. Thus, the second example aspect may provide for a higher link efficiency by allowing base station 105b either to transmit using the modified transmission configuration when the uplink CTS on the adjacent channel is detected or transmit on the full channel when no uplink CTS detected.

Figure 7:
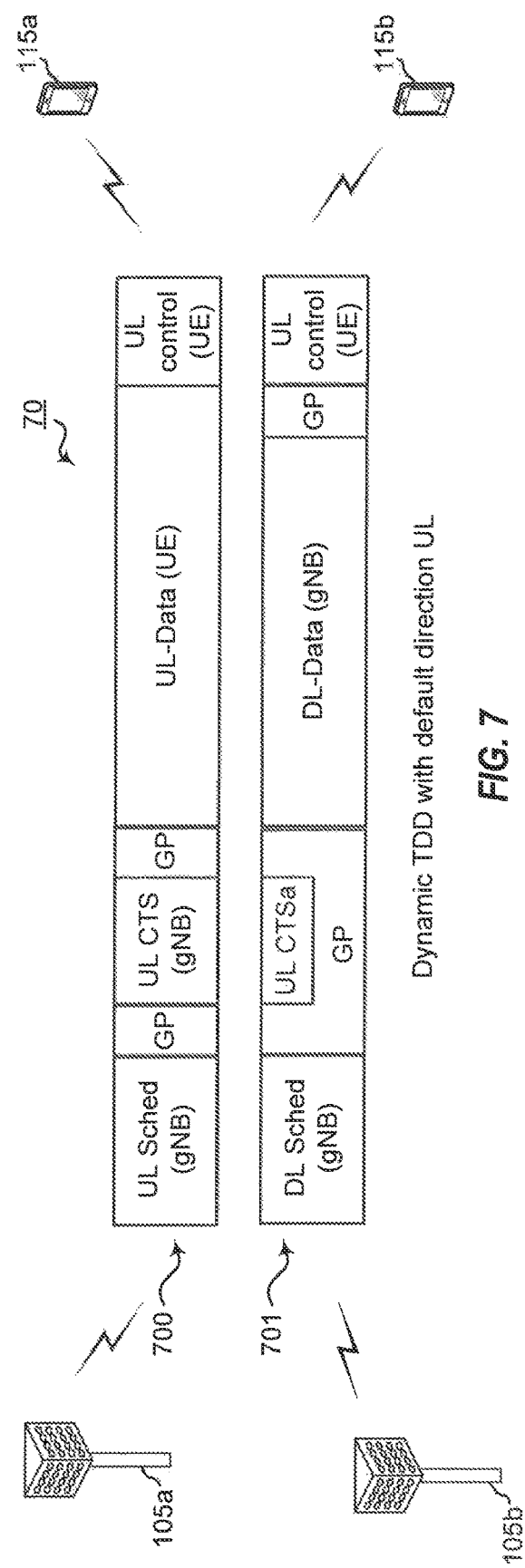
FIG. 7 is a block diagram illustrating co-site base stations and UEs configured according to one aspect the present disclosure.

FIG. 7 is a block diagram illustrating co-site base stations, base stations 105a-105b, and UEs 115a-115b configured according to one aspect the present disclosure. Similar to the operations of FIG. 6, base station 105a and UE 115a are from a first network operator and communicate on transmission stream 700 using a first channel, while base station 105b and UE 115b are from a second network operator and communicate on transmission stream 701 using a second channel that's adjacent to the first channel. The multiple network operators may agree on the transmission configuration including a set of fixed TTIs dedicated for downlink or uplink with no dynamic TDD allowed and a set of flexible TTS where dynamic TDD transmissions are allowed.

In the example aspect of FIG. 7, instead of measuring uplink CTS on the adjacent channel, base station 105a from the first network operator having a default uplink direction 70 transmits the uplink CTS not only on the first channel on transmission stream 700, but also on the adjacent channel on transmission stream 701. Thus, on every channel, base stations from multiple network operators transmit uplink CTS, where the uplink CTS sent from different network operators may be frequency division multiplexed (FDM'd). Base station 105a would also send the uplink CTS on transmission stream 701 using the center band. If base station 105b does not detect uplink CTS from on transmission stream 701 from its own second network operator, but detects uplink CTSa from base station 105a of the first network operator, base station 105b may use the modified transmission configuration (e.g., center band or reduced power on edge bands) to transmit downlink data in default uplink direction 70. However, if base station 105b does not detect uplink CTS from any base stations with any network operator, base station 105b may use the full band to transmit the downlink data.

Thus, in the aspect of FIG. 7, the link efficiency could be higher as base station 105b can adjust its transmission bandwidth or power depending on whether the other network operator needs to protect default uplink direction 70. Base station 105b would not need to tune to the adjacent channel of transmission stream 700 to monitor for uplink CTS.

It should be noted that, in such aspects as illustrated in FIG. 7, base station 105a may use additional coordination or regulation in order to transmit in the adjacent channel belonging to a different network operator.

Figure 8:
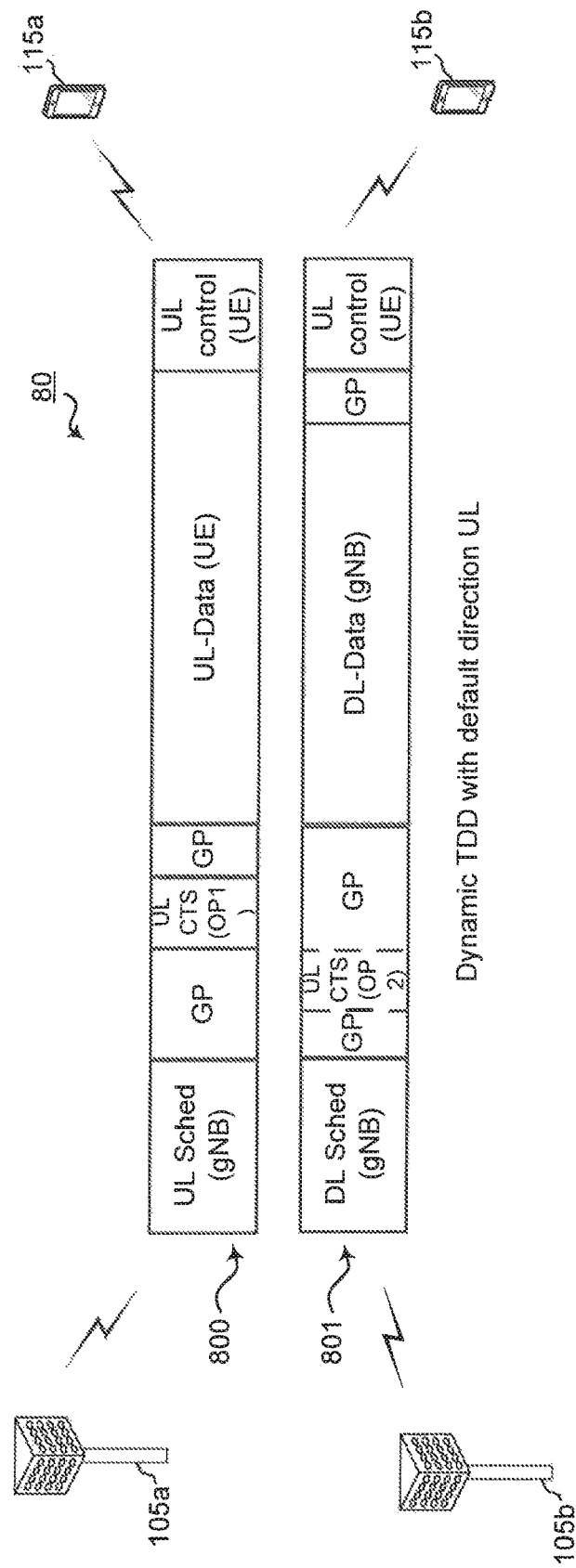
FIG. 8 is a block diagram illustrating co-site base stations and UEs configured according to one aspect the present disclosure.

FIG. 8 is a block diagram illustrating co-site base stations, base stations 105a-105b, and UEs 115a-115b configured according to one aspect the present disclosure. Similar to the operations of FIGS. 6 and 7, base station 105a and UE 115a are from a first network operator and communicate on transmission stream 800 using a first channel, while base station 105b and UE 115b are from a second network operator and communicate on transmission stream 801 using a second channel that's adjacent to the first channel. The multiple network operators may agree on the transmission configuration including a set of fixed TTIs dedicated for downlink or uplink with no dynamic TDD allowed and a set of flexible TTS where dynamic TDD transmissions are allowed.

In the example aspect of FIG. 8, different network operators are assigned specific CTS symbol locations in their own channel for transmission of uplink CTS. On flexible TTIs with default uplink direction 80, each network operator in the region will have a dedicated uplink CTS symbol location within their own channel. For example, within the first channel of transmission stream 800, the first network operator is assigned a symbol location for uplink CTS. Similarly, the second network operator is assigned a different symbol location for uplink CTS. The other base stations of any given network operator will not transmit signals on the uplink CTS symbol dedicated to other network operator. When transmitting the uplink CTS, is will be transmitted by the base station, e.g., base station 105a, to occupy the edge band in order for base station 105b of the second network operator to perform energy detection of any other uplink CTS.

When base station 105b wants to flip the default uplink direction 80 to the downlink, base station 105b would measure for the uplink CTS dedicated to its own second network operator. Base station 105b would further perform energy detection on its own channel in transmission stream 801 to measure the signal leakage from an adjacent channel on transmission stream 800 on the CTS symbol dedicated to the other first network operator. Base station 105b does not need to go to adjacent channel to perform energy detection to minimize the complexity. If 105b does not detect the uplink CTS from its own network second network operator, but is able to detect energy leakage above a threshold at the known CTS symbol location for the other network operators, base station 105b assumes the other network operator will be receiving uplink data in the default uplink direction 80 and, hence, transmit its downlink data using the modified transmission configuration of center band only transmission or reduced power on the edge bands. Otherwise, if base station 105b does not detect uplink CTS from the other base stations of the its own second network operator, and does not detect CTS energy at the CTS symbol locations of other network operators above the threshold, base station 105b will transmit downlink using the entire band to in default uplink direction 80.

Various additional aspects of the present disclosure may be directed to multiple network operators within a co-site scenario pooling the adjacent channels to perform spectrum sharing. When multiple base stations or cells from different network operators are close enough to cause sufficient cross-link cross-operator interference, the adjacent channels from each operator may be pooled together and shared among the multiple co-site base stations.

Figure 9:
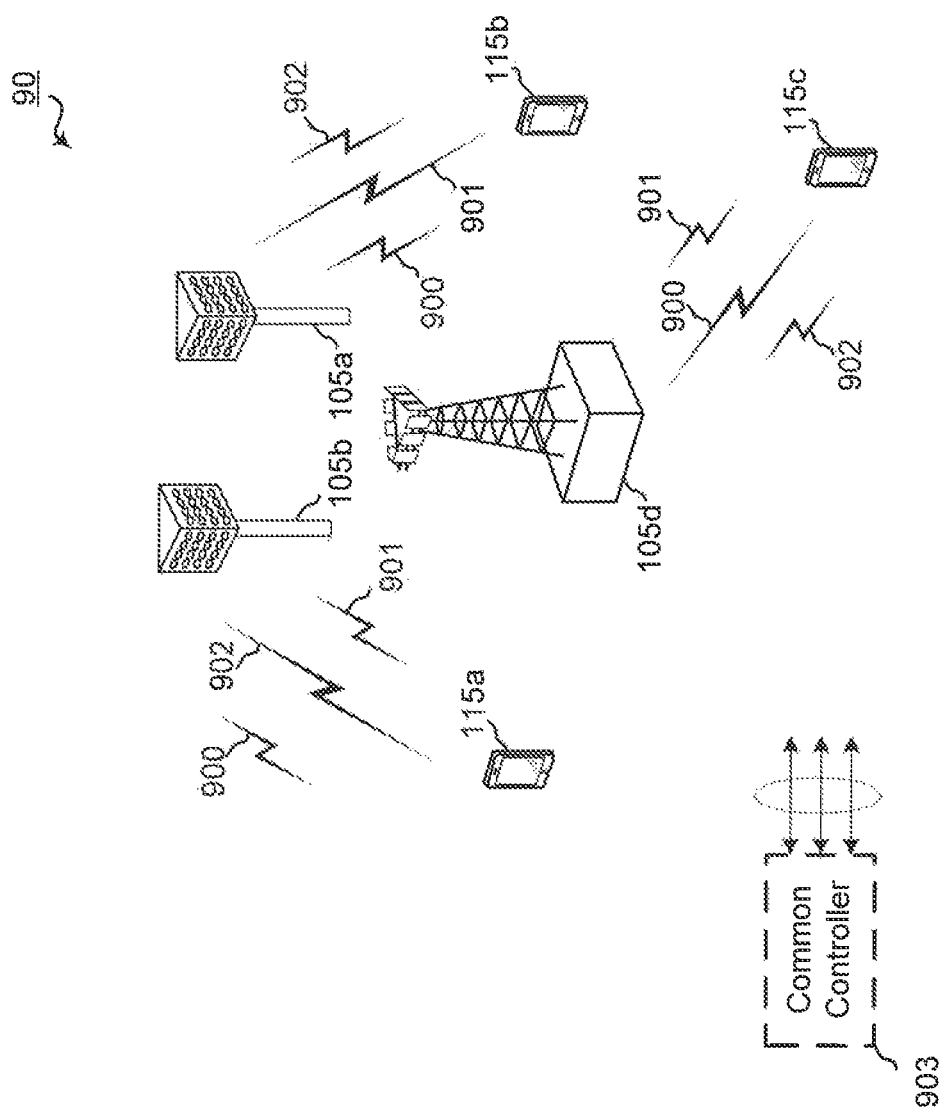
FIG. 9 is a block diagram illustrating combined network having base stations configured according to one aspect of the present disclosure.

FIG. 9 is a block diagram illustrating combined network 90 having base stations 105a, 105b, and 105d configured according to one aspect of the present disclosure. Base stations 105a, 105b, and 105d conduct communications with UE 115a, 115b, and 115c, respectively. Each of the base stations is operated by a different network operator. For example, base station 105a is operated by a first network operator, base station 105b is operated by a second network operator, and base station 105d is operated by a third network operated. Each network operator offers a particular channel of operation for their respective base stations 105a, 105b, and 105c, which are adjacent to one another. Base station 105a and 105b occupy the same site location (for clarity of FIG. 9, 105a and 105b are illustrated separately), while base station 105d is very close geographically to the shared site.

At set up of the network at combined network 90, the network operators agree to pool each operator's channel into a shared spectrum operation. In one example, details of any of base stations 105a, 105b, and 105c may be represented by gNB 105 (FIG. 10). The pooling of channels may be saved at communication configuration 1001, in memory 242. The channel from each operator, however, is identified as the primary channel for any base station of that operator. Thus, the first network operator has channel 901, which is identified as the primary channel for base station 105a. The second network operator has channel 902, which is identified as the primary channel for base station 105b, and the third network operator has channel 900, which is identified as the primary channel for base station 105d. Transmissions for the base station have priority in its own primary channel. Therefore, the essential system information, control information, low-latency traffic, and the like can be sent on the primary channel. Each of base stations 105a, 105b, and 105c may use the other pooled adjacent channels from the other operators as secondary channels for opportunistic transmission when the base stations of the operator for which the channel is a primary channel is not transmitting. For example, gNB 105 may execute shared spectrum logic 1004. The execution environment of shared spectrum logic 1004 allows gNB 105 to transmit control signals and higher-priority date via the primary channel while engaging in a contention-based or other sharing mechanism for the secondary channels.

For example, base station 105a may transmit control data and critical system information over channel 901 to UE 115b and may opportunistically transmit data to UE 115b using the secondary channels, channels 900 and 902, if base stations 105b and 105c are not involved in active transmissions, respectively, with UEs 115a and 115c. Similarly, base station 105b may transmit low-latency data over channel 902, while opportunistically transmitting data over channels 900 and 901, and base station 105d may transmit critical data over channel 900, while opportunistically transmitting data over channels 901 and 902, if those secondary channels are clear.

The coordination of the pooling may be initiated by each network operator when setting up the base stations in the geographic area. Alternatively, if a common controller, such as common controller 903, is used to facilitate coordination between base stations 105a, 105b, and 105d of the different network operators, common controller 903 may operate to direct the pooling and the shared spectrum operations.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 5A and 5B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
receiving, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications;
detecting, by the first base station, data available for downlink transmission on a first channel during one of the plurality of flexible transmission intervals;
monitoring, by the first base station, for an uplink reservation signal from one or more base stations of the plurality of base stations, wherein the first base station is operated by a first network operator at a first channel and at least one adjacent base station of the one or more base stations is operated by another network operator on a second channel adjacent to the first channel; and
determining, by the first base station, whether to transmit the data based on results of the monitoring.

2. The method of claim 1, further including:
failing to detect, by the first base station, the uplink reservation signal in response to the monitoring, wherein the determining whether to transmit includes determining to transmit the data; and
transmitting, by the first base station, the data using a modified transmission configuration, wherein the modified transmission configuration includes one of:
transmitting the data on the center band of a transmission band; or
transmitting the data over the transmission band with a reduced power below a predetermined threshold for transmissions at both edge bands of the transmission band.

3. The method of claim 1, further including:
failing to detect, by the first base station, the uplink reservation signal from one or more neighbor base stations operated by the first network operator of the one or more base stations;
detecting, by the first base station, the uplink reservation signal in the second channel from the at least one adjacent base station, wherein the determining to transmit includes determining to transmit the data; and
transmitting, by the first base station, the data using a modified transmission configuration, wherein the modified transmission configuration includes one of:
transmitting the data on the center band of a transmission band; or
transmitting the data over the transmission band with a reduced power below a predetermined threshold for transmissions at both edge bands of the transmission band.

4. The method of claim 1, further including:
failing to detect, by the first base station, the uplink reservation signal in either of the first channel and the second channel from the one or more base stations in response to the monitoring, wherein the determining whether to transmit includes determining to transmit the data; and
transmitting, by the first base station, the data using an unmodified transmission configuration over a transmission band.

5. The method of claim 1, further including:
failing to detect, by the first base station, the uplink reservation signal from one or more neighbor base stations operated by the first network operator of the one or more base stations;
detecting, by the first base station, the uplink reservation signal in the first channel from the at least one adjacent base station, wherein the determining to transmit includes determining to transmit the data; and
transmitting, by the first base station, the data using a modified transmission configuration, wherein the modified transmission configuration includes one of:
transmitting the data on the center band of a transmission band; or
transmitting the data over the transmission band with a reduced power below a predetermined threshold for transmissions at both edge bands of the transmission band.

6. The method of claim 1, further including:
failing to detect, by the first base station, the uplink reservation signal in the first channel from the one or more base stations in response to the monitoring, wherein the determining whether to transmit includes determining to transmit the data; and
transmitting, by the first base station, the data using an unmodified transmission configuration over a transmission band.

7. The method of claim 1, wherein the monitoring includes:
monitoring a first symbol location in the first channel associated with reservation signal transmission from base stations operated by the first network operator;
monitoring a second symbol location in the first channel associated with adjacent reservation signal transmission from adjacent base stations operated by the another network operator.

8. The method of claim 7, further including:
failing to detect, by the first base station, the uplink reservation signal in the first symbol location;
detecting, by the first base station, the uplink reservation signal in the second symbol location, wherein the determining to transmit includes determining to transmit the data; and
transmitting, by the first base station, the data using a modified transmission configuration, wherein the modified transmission configuration includes one of:
transmitting the data on the center band of a transmission band; or
transmitting the data over the transmission band with a reduced power below a predetermined threshold for transmissions at both edge bands of the transmission band.

9. The method of claim 7, further including:
failing to detect, by the first base station, the uplink reservation signal in both of the first symbol location and the second symbol location, wherein the determining whether to transmit includes determining to transmit the data; and
transmitting, by the first base station, the data using an unmodified transmission configuration over a transmission band.

10. A method of wireless communication, comprising:
receiving, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications, and wherein the first base station is operated by a first network operator at a first channel and at least one adjacent base station of the one or more base stations is operated by another network operator on a second channel adjacent to the first channel;

receiving, by the first base station, a request for uplink transmission on a first channel during one of the plurality of flexible transmission intervals; and transmitting, by the first base station, an uplink reservation signal.

11. The method of claim 10, wherein the uplink reservation signal is transmitted on the first channel according to a modified transmission configuration, wherein the modified transmission configuration includes one of:

transmitting the uplink reservation signal on the center band of a transmission band; or transmitting the uplink reservation signal over the transmission band with a reduced power below a predetermined threshold for transmissions at both edge bands of the transmission band.

12. The method of claim 10, wherein the uplink reservation signal is transmitted:

on the first channel, and on the second channel using a frequency divisional multiplexing of other transmitted uplink reservation signals within a center band of a transmission band of the second channel.

13. The method of claim 10, wherein the uplink reservation signal is transmitted in a reserved symbol location associated with the first operator, wherein the reserved symbol location is in at least one edge band of a transmission band of the first channel.

14. A method of wireless communications, comprising:

transmitting, by a first base station operated by a first network operator, system information over a primary channel of a plurality of pooled adjacent channels, wherein the plurality of pooled adjacent channels includes the primary channel associated with the first network operator and at least one additional channels each of the at least one additional channels associated with at least one additional network operators;

identifying, by the first base station, non-critical data for transmission;

monitoring, by the first base station, for communications on one adjacent channel of the at least one additional channels with another base station operated by the at least one additional network operators; and transmitting, by the first base station, the non-critical data on the one adjacent channel in response to failure to detect transmissions on the one adjacent channel.

15. An apparatus configured for wireless communication, the apparatus comprising:

at least one processor; and a memory coupled to the at least one processor, wherein the at least one processor is configured:

to receive, at a first base station of a plurality of base stations, a communications configuration, wherein the communications configurations identifies a plurality of fixed transmission intervals each of which having a fixed transmission direction, a plurality of flexible transmission intervals, and a default priority direction identifying a default uplink priority direction for communications;

to detect, by the first base station, data available for downlink transmission on a first channel during one of the plurality of flexible transmission intervals;

to monitor, by the first base station, for an uplink reservation signal from one or more base stations of the plurality of base stations, wherein the first base station is operated by a first network operator at a first channel and at least one adjacent base station of the one or more base stations is operated by another network operator on a second channel adjacent to the first channel; and to determine, by the first base station, whether to transmit the data based on results of execution of the configuration of the at least one processor to monitor.

16. The apparatus of claim 15, further including configuration of the at least one processor:

to fail to detect, by the first base station, the uplink reservation signal in response to the configuration to monitor, wherein the configuration of the at least one processor to determine whether to transmit includes configuration to determine to transmit the data; and to transmit, by the first base station, the data using a modified transmission configuration, wherein the modified transmission configuration includes configuration of the at least one processor to one of:

transmit the data on the center band of a transmission band; or transmit the data over the transmission band with a reduced power below a predetermined threshold for transmissions at both edge bands of the transmission band.

17. The apparatus of claim 15, further including configuration of the at least one processor:

to fail to detect, by the first base station, the uplink reservation signal from one or more neighbor base stations operated by the first network operator of the one or more base stations;

to detect, by the first base station, the uplink reservation signal in the second channel from the at least one adjacent base station, wherein the configuration of the at least one processor to determine to transmit includes configuration to determine to transmit the data; and to transmit, by the first base station, the data using a modified transmission configuration, wherein the modified transmission configuration includes configuration of the at least one processor to one of:

transmit the data on the center band of a transmission band; or transmit the data over the transmission band with a reduced power below a predetermined threshold for transmissions at both edge bands of the transmission band.

18. The apparatus of claim 15, further including configuration of the at least one processor:

to fail to detect, by the first base station, the uplink reservation signal in either of the first channel and the second channel from the one or more base stations in response to the configuration to monitor, wherein the configuration of the at least one processor to determine whether to transmit includes configuration to transmit the data; and to transmit, by the first base station, the data using an unmodified transmission configuration over a transmission band.

19. The apparatus of claim 15, further including configuration of the at least one processor:

to fail to detect, by the first base station, the uplink reservation signal from one or more neighbor base stations operated by the first network operator of the one or more base stations;

to detect, by the first base station, the uplink reservation signal in the first channel from the at least one adjacent base station, wherein the configuration of the at least one processor to determine to transmit includes configuration to determine to transmit the data; and to transmit, by the first base station, the data using a modified transmission configuration, wherein the modified transmission configuration includes configuration of the at least one processor to one of:
   transmit the data on the center band of a transmission band; or
   transmit the data over the transmission band with a reduced power below a predetermined threshold for transmissions at both edge bands of the transmission band.

20. The apparatus of claim 15, further including configuration of the at least one processor:
   to fail to detect, by the first base station, the uplink reservation signal in the first channel from the one or more base stations in response to the configuration to monitor, wherein the configuration of the at least one processor to determine whether to transmit includes configuration to determine to transmit the data; and
   to transmit, by the first base station, the data using an unmodified transmission configuration over a transmission band.

21. The apparatus of claim 15, wherein the configuration of the at least one processor to monitor includes configuration of the at least one processor:
   to monitor a first symbol location in the first channel associated with reservation signal transmission from base stations operated by the first network operator;
   to monitor a second symbol location in the first channel associated with adjacent reservation signal transmission from adjacent base stations operated by the another network operator.

22. The apparatus of claim 21, further including configuration of the at least one processor:
   to fail to detect, by the first base station, the uplink reservation signal in the first symbol location;
   to detect, by the first base station, the uplink reservation signal in the second symbol location, wherein the configuration of the at least one processor to determine to transmit includes configuration to determine to transmit the data; and
   to transmit, by the first base station, the data using a modified transmission configuration, wherein the modified transmission configuration includes configuration of the at least one processor to one of:
      transmit the data on the center band of a transmission band; or
      transmit the data over the transmission band with a reduced power below a predetermined threshold for transmissions at both edge bands of the transmission band.

23. The apparatus of claim 15, further including configuration of the at least one processor:
   to fail to detect, by the first base station, the uplink reservation signal in both of the first symbol location and the second symbol location, wherein configuration of the at least one processor to determine whether to transmit includes configuration to determine to transmit the data; and
   to transmit, by the first base station, the data using an unmodified transmission configuration over a transmission band.

* * * * *